(12) United States Patent
Akporiaye

(10) Patent No.: US 6,471,393 B1
(45) Date of Patent: Oct. 29, 2002

(54) PARALLEL STIRRING APPARATUS

(75) Inventor: Duncan E. Akporiaye, Oslo (NO)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/104,279

(22) Filed: Mar. 21, 2002

Related U.S. Application Data

(62) Division of application No. 09/617,184, filed on Jul. 14, 2000, now Pat. No. 6,361,203.

(51) Int. Cl.[7] .................................................. B01F 7/16
(52) U.S. Cl. ..................... 366/297; 366/292; 366/197; 366/331
(58) Field of Search .................... 366/297, 298, 366/299, 300, 301, 292, 169.1, 197, 199, 331, 349, 348; 435/DIG. 43

(56) References Cited

U.S. PATENT DOCUMENTS

| 673,143 A | 4/1901 | Sette ........................ 165/109.1 |
| 675,593 A | 6/1901 | Haworth ..................... 366/300 |
| 780,588 A | 1/1905 | Walber ......................... 74/77 |
| 1,374,445 A | 4/1921 | Greenawalt ................... 261/87 |
| 1,605,596 A | 11/1926 | Langelier ..................... 210/738 |
| 1,733,516 A | 10/1929 | Rodin et al. ................. 366/300 |
| 2,628,827 A | 2/1953 | Daman .......................... 261/87 |
| 2,892,543 A | 6/1959 | Daman ......................... 209/169 |
| 3,054,230 A | 9/1962 | Logue .......................... 51/163 |
| 3,647,066 A | 3/1972 | Potts et al. .................. 209/169 |
| 4,261,953 A | 4/1981 | Gisler ......................... 422/162 |
| 4,676,654 A | 6/1987 | Fleckner ....................... 366/98 |
| 4,811,909 A | 3/1989 | Inoki ........................... 241/33 |
| 5,195,824 A | 3/1993 | Stromberg et al. .......... 366/131 |
| 5,337,965 A | 8/1994 | Chiovitti ...................... 241/19 |

FOREIGN PATENT DOCUMENTS

| WO | WO 98/39099 | 9/1998 |
| WO | WO 00/09255 | 2/2000 |

*Primary Examiner*—Tony G. Soohoo
(74) *Attorney, Agent, or Firm*—John G. Tolomei; Frank S. Molinaro; Maryann Maas

(57) ABSTRACT

An apparatus and method useful for simultaneously stirring a plurality of reaction mixtures has been developed. The apparatus includes N gears, where N is at least 2, with each gear having a hub and multiple teeth, material removed from the hub to form a passage through the gear; a motor associated with at least one gear; N reaction vessels associated with the N gears; and a stirrer fastened to each of the gears, with the stirrers extending into the reaction vessels.

20 Claims, 6 Drawing Sheets

PARALLEL STIRRING APPARATUS

CROSS REFERENCE TO RELATED APPLICATION

This application is a divisional application of, and claims priority of, our application U.S. application Ser. No. 09/617,184 filed Jul. 14, 2000, issuing as U.S. Pat. No. 6,361,203 on Mar. 26, 2002, which is thereby incorporated by reference in its entirety.

FIELD OF THE INVENTION

The present invention is an apparatus for stirring or mixing and a process for adding reagent to a plurality of reaction vessels while simultaneously stirring the plurality of reaction mixtures.

BACKGROUND OF THE INVENTION

When reagent is added to a reaction mixture, it is generally considered necessary to stir the mixture in order to achieve a homogeneous mixture and to prevent phase separation. Stirring is even more important when the reaction mixture is viscous. If a viscous reaction mixture was not stirred upon the addition of a reagent, it is likely that the reagent would not be distributed homogeneously throughout the reaction mixture which could result in an incomplete reaction and misleading or inconclusive data.

Recently, chemical reactions and materials syntheses have been conducted using combinatorial techniques. In the combinatorial approach, multiple reactions are conducted in parallel. Applying the combinatorial methods to more viscous materials gave rise to a need for parallel stirring or mixing. It became especially desirable to have the capability to stir an array of parallel reaction mixtures while reagent is being added. Others have used agitation-type mixing in parallel; see WO 98/39099. However, the present invention provides the advantages of adding reagent while stirring and adding the reagent to a central portion of the cross-section of the reaction vessel. Additionally, magnetic or shaking stirrers may not be effective enough to homogenize viscous gels. The present invention is designed to simulate the high shear mixers used in large-scale material preparations.

SUMMARY OF THE INVENTION

The invention is an apparatus for mixing a reaction mixture in a vessel while at the same time adding reagent to the reaction mixture. The invention is particularly useful when the reaction mixture is viscous as is commonly found in sol gel reactions. The apparatus involves N rotary drive members, where N is at least 2, where each rotary drive member has a hub with material removed from the hub to form a passage through the rotary drive member; a motor drivably associated with at least one rotary drive member; and a stirrer engaged with each of the rotary drive members. A preferred embodiment of the apparatus involves N gears, where N is at least 1, with each gear having a hub and multiple teeth. Material is removed from the hub to form a passage through the hub of the gear. A motor is associated with at least one gear in order to drive the rotation of the gear. N reaction vessels are associated with the N gears; and a stirrer is fastened to each of the gears, with the stirrer extending into the reaction vessel.

The invention also encompasses a method for adding reagent to a plurality of reaction vessels where each reaction vessel contains a reaction mixture. The method begins with providing the apparatus described above. Then reagent is added to the plurality of reaction vessels via conduits that are in fluid communication with the passage through the gear. The multiple reaction mixtures are simultaneously stirred during the addition of reagent by activating the motor and driving the gears.

The drawings have been simplified by deleting other equipment used in conjunction with the apparatus of the present invention.

DETAILED DESCRIPTION OF THE APPARATUS

In general terms the apparatus of the present invention includes at least two rotary drive members. It is preferred that the rotary drive members are gears, each having a hub and multiple teeth, however, other rotary drive members may be used such as wheels driven by friction or belt and wheel assemblies. For ease of understanding and without limiting the scope of the invention, the description below refers to the preferred embodiment containing gears. The gears are preferably positioned so that the teeth of one of the gears engage the teeth of the other gear. The hub of the gears has material removed so as to form a passage through the gear. A motor is used to rotate the gears. Attached to each of the gears is at least one stirrer. Each stirrer extends into a vessel which is one of an array of reaction vessels. The positioning and geometry of the stirrer is such that reagent may be added through the passage of the gear and into the reaction mixture. The apparatus is used for stirring or mixing a reaction mixture, particularly while reagent is being added to the mixture, and the apparatus can be used with essentially any synthetic reaction. Reagent is added to the plurality of reaction vessels via a plurality of conduits that are each in fluid communication with one passage through a gear. During addition of the reagent, the motor is activated and the gears are rotating thereby driving the stirrer in a circular pattern so that all of the reaction mixtures are being simultaneously stirred during the reagent addition.

Figure 1:
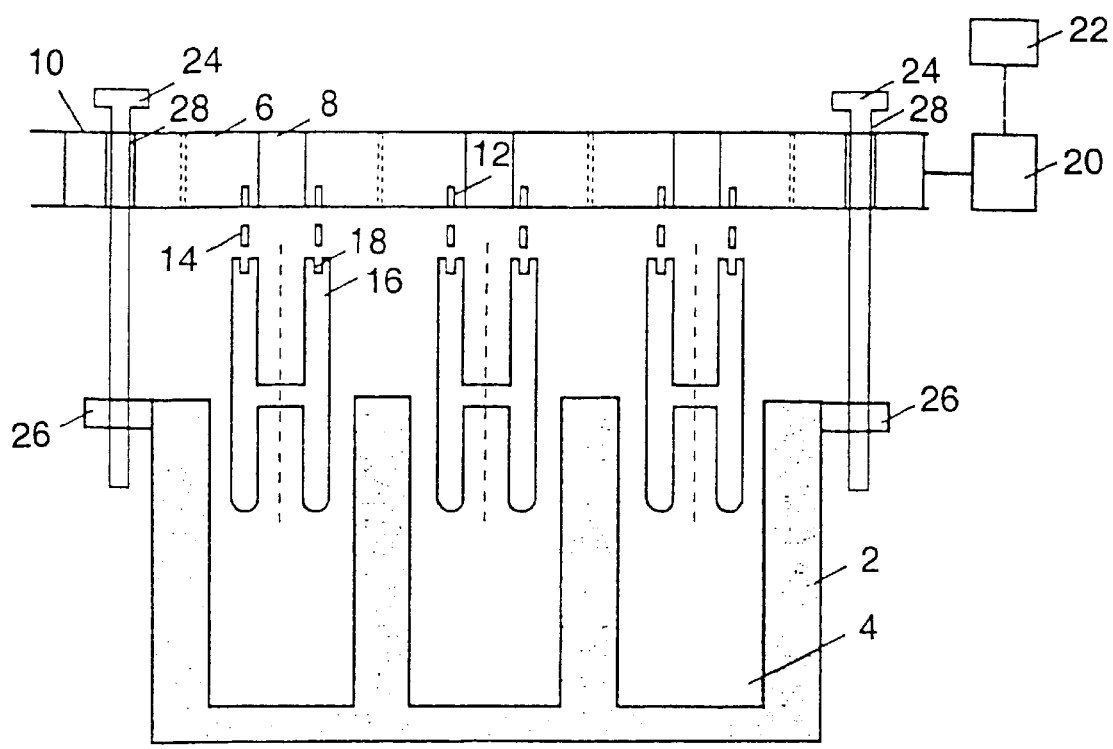
FIG. 1 is a sectional side view of one embodiment of the general apparatus.

FIG. 1 shows a general exploded cross sectional view of the apparatus. A central block 2, defines an array of wells 4, which are the reaction vessels. The gears 6 have a portion of the hub removed to form passages 8, and have additional material removed to form peg inputs 12. Gears 6 are supported by gear support framework 10. Gears 6 engage one another and are driven by motor 20 which is controlled by microprocessor 22. Both gear support 10 and central block 2 have guides, 28 and 26, respectively, for use with guide pins 24. Guide pins 24 operate to align passages 8 over wells 4. Stirrers 16 have material removed to form peg inputs 18. Stirrers 16 engage the gears 6 via pegs 14 which are inserted into gear peg inputs 12 and stirrer peg inputs 18.

As noted above, many types of rotary drive units may be employed in the present invention, and the use of gears having a hub and multiple teeth is merely the preferred embodiment of the invention. For example, wheels interconnected by one or more belts may be employed or wheels that engage one another based upon frictional interactions may be employed. However, the bulk of the discussion below will focus on the preferred embodiment that employs gears. In the preferred embodiment, at least two gears are used in combination in the present preferred apparatus. When the array of reaction vessels contains greater than two vessels, it is preferred that the number of gears equal the number of reaction vessels. For example, a combinatorial stirrer used with an array of 96 reaction vessels would preferably contain 96 gears. The gears may be constructed out of stainless steel, plastic, and plastic coated metal. The gears may be coated to increase chemical resistance. The gears each contain a central hub and a multiplicity of teeth or cogs along the edge of the hub.

A portion of the central hub is removed to form at least one passage through the hub. The position of the passage through the hub and the size of the passage through the hub are dependent upon the particular application of the apparatus. As discussed in more detail below, the primary purpose of the passage through the hub is to introduce fluid such as reagents to the reaction vessels while stirring the reaction mixture. The passage is located at the center of the hub. The size of the passage through the hub may be dependent upon the fluid delivery system being employed and the gear size. The shape of the passage may be any of a variety of shapes. For ease of manufacture, a cylindrical bore may be preferred. A funnel shaped passage may also be advantageous in facilitating the entry of a fluid stream and minimizing the probability of fluid leaving the reaction vessel. Yet another alternative allows for a septum to be placed within the passage to prevent evaporation or material exiting the reaction vessel. The fluid delivery system would penetrate the septum for fluid delivery to the reaction vessel. It is preferred that a hollow shaft be positioned within the passage through the hub. The shaft would rotate with the rotation of the gears, and would extend beyond the gear.

It is preferred that the gears be of a size appropriate to the size and arrangement of the vessels in the array of reaction vessels. It is preferred that the gears are sized so that the teeth of a first gear that is associated with a first vessel engage the teeth of a second gear that is associated with a second vessel. Alternatively, auxiliary gears may be interspersed between the gears that are associated with the vessels.

Groups of vessels may be defined so that the gears associated within a group of vessels engage one another. Multiple groups may be defined within the array of gears and associated reaction vessels, with the member gears of a first group being unable to engage the member gears of a second group. For example, if the array of reaction vessels is arranged in a grid pattern, the gears may be grouped by rows or columns so that the gears of a first row or column do not engage the gears of a second row or column. The gears within a single row or column may engage each other. Alternatively, the grid of gears may be grouped in quadrants or sections with the gears within a quadrant or section capable of engaging only other gears within the same quadrant or section. The gears may be positioned all in the same plane but dispersed in such a way that only the gears of a defined group engage one another. In another embodiment, the gears may be positioned at different heights so that only gears of a defined group engage one another.

In combinatorial techniques, it is preferred to manipulate equipment in units as opposed to individually. For example, it is preferred that the array of reaction vessels be commonly supported or interconnected so that the array may be manipulated, moved, or handled as a single unit. The same preference applies to the present invention as well. It is preferred that the array of gears be supported in a configuration that would allow the array to be manipulated, moved, and handled as a unit, such as, for example, as a cassette of gears. The cassette may contain one or more support plates to position the gears and to provide a rigid structure that may be handled as a unit. Bearings may be used in conjunction with the support plates and gears to allow the gears to rotate within the framework of the support plates. It is preferred that the cassette have a guide, such as, for example, a guide pin, that is in alignment with another guide on the array of reaction vessels to aid in the alignment of the cassette in reaction to the array of reaction vessels. It is further an option to incorporate a locking device to retain the gear support in the proper position in relation to the array of reaction vessels.

Each gear may be optionally further equipped with a means for attaching at least one stirrer. For example, the gears may have material removed for the stirrer screw or snap into, or for a peg to fit into, or the gears may have a protrusion or flap for affixing to the stirrer. The gears may be equipped with electromagnets for the attachment of the stirrers. Optionally, the stirrer may be attached to a hollow shaft that may be positioned within the passage through the hub, extending below the gear and the cassette.

Figure 2:
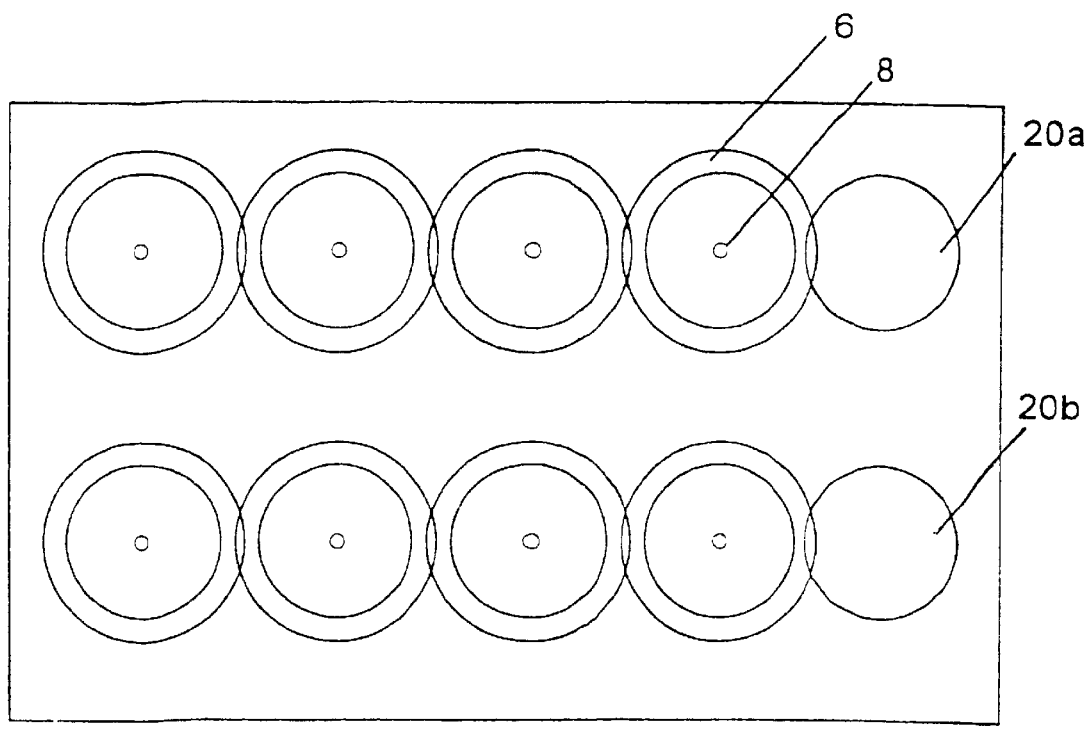
FIG. 2 is a top view of a gear cassette.
Figure 3:
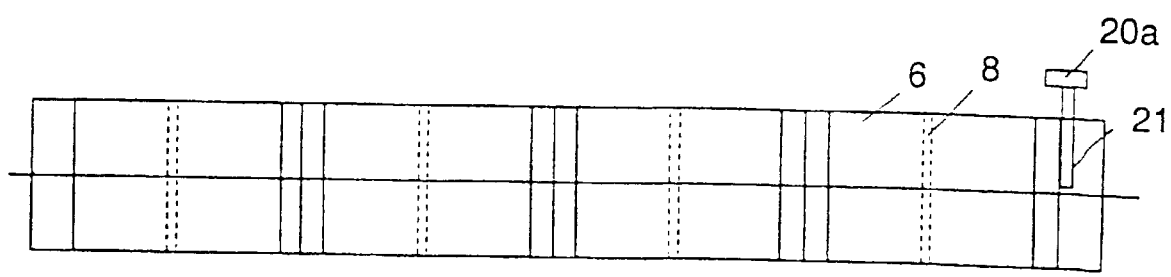
FIG. 3 is a side view of the gear cassette of FIG. 2.
Figure 4:
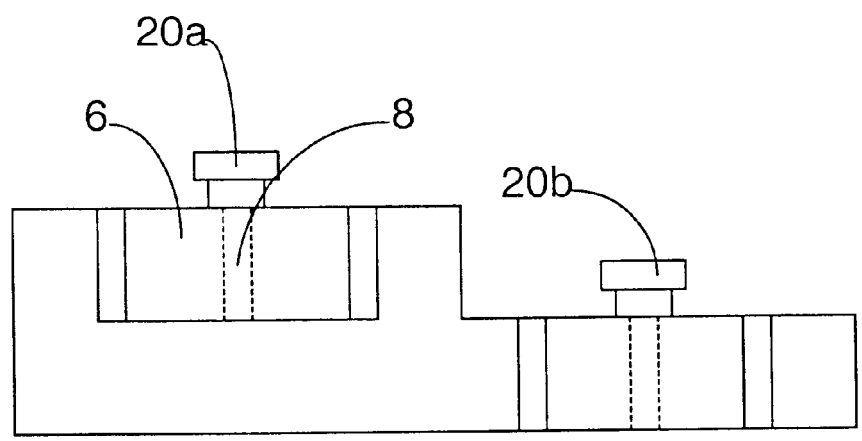
FIG. 4 is an end view of the gear cassette of FIG. 2.

One possible gear arrangement is shown in FIG. 2, FIG. 3, and FIG. 4. FIG. 2 is a top view of a gear cassette, while FIG. 3 is a side view of the same cassette and FIG. 4 is an end view of the same cassette. Gears 6 are arranged in two rows with each gear in a row engaging one another. Note that in another embodiment, the gears of the two rows may also engage one another. Gears in the first row are driven by motor 20a via a drive shaft and gears in the second row are driven by motor 20b via a drive shaft. Again note that in another embodiment, all gears may be driven by a single motor. FIG. 3 and FIG. 4 show that the gears in the first row are positioned at a first height, and the gears in the second row are positioned at a second height. While the figures show one possible gear arrangement, it may be preferred, especially where the reaction vessels are evenly distributed with a constant center-to-center distance, that all the gears engage one another, and be driven by a single motor.

Figure 5:
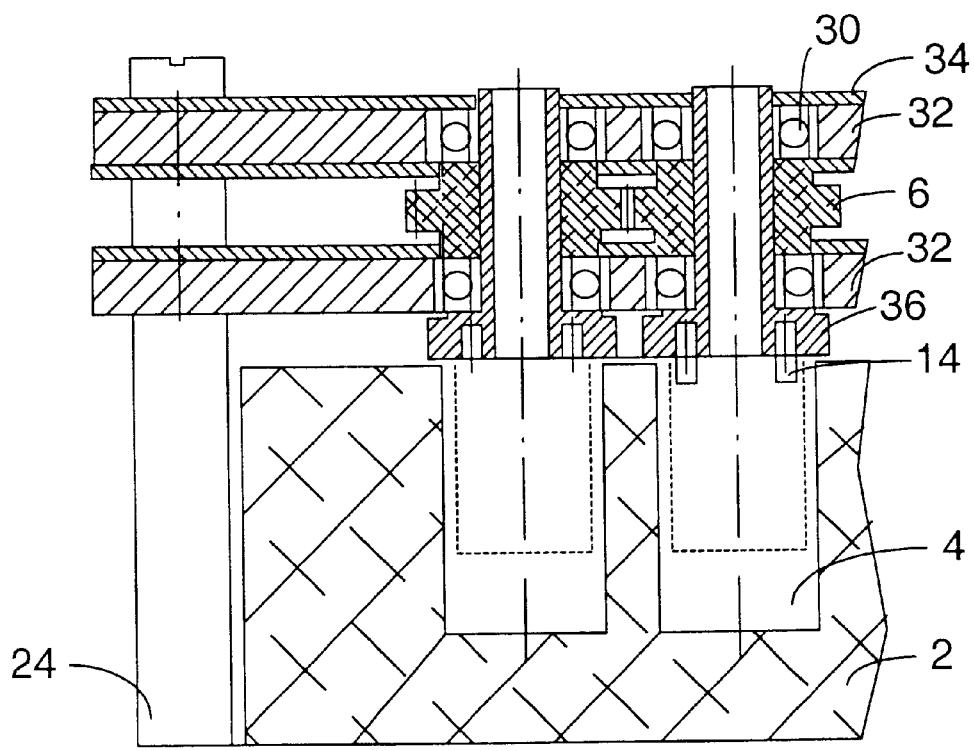
FIG. 5 is a sectional side view of the gear support and hollow shaft embodiments.

FIG. 5 shows the gear support framework and the hollow shaft embodiment. The hollow shafts 36 are positioned within the passages through the hub of the gears 6. The rotary motion of the gears also turns hollow shafts 36. Bearings 30 allow for the rotation of the hollow shaft while being supported by bearing support plates 32 and cover plate 34. Hollow shafts 36 have material removed for the insertion of pegs 14 to which a stirrer would be attached (not shown).

At least one motor is used to drive the rotation of the gears. A single motor may be used to drive all the gears, or several motors may be employed. When the gears are in defined groups, a single motor may be used for each of the groups. It is preferred that the motor be capable of operating at different speeds so that speed may be set or adjusted to conform to the viscosity of the reaction mixture or reagents being mixed. The speed may also be adjusted dynamically, such as beginning slowly and increasing with time to a set maximum and then decreasing with time. The speed could be held constant at any point for the addition of reagents. The control of the speed may be adjusted at the motor itself, or the motor could be connected to a microprocessor controller through which the speed could be controlled.

In yet another embodiment, the motor may be connected to a timer and programmed to activate at specific times. For example, the timer may activate the motor just prior to the time of the reagent addition and stop the motor at or for a set time period after reagent addition. Alternatively, the motor may be interconnected with the reagent delivery system so that activation of the reagent delivery system also activates the motor. All of the above may be controlled through a central microprocessor.

The one or more stirrers that are attached to the gear or to a hollow shaft positioned with the passage through the hub of the gear may be of any of a variety of styles or shapes constructed from a variety of materials. The specific shape selected, as well as the material used, may be dependent upon the particular application. A suitable stirrer will be able to provide sufficient mixing in the reaction mixture so as to form a homogeneous mixture. A suitable stirrer would also allow for the addition of reagents, preferably at a location in the vicinity of the center portion of the cross-section of the reaction vessel. The shape and design of the stirrer should not operate to pull material out of the reaction vessels.

The stirrers may be constructed of material such as Teflon™, glass, quartz, stainless steel, ceramic, polypropylene, and polyethylene. The material chosen is preferably chemically resistant to the reactants and products in the reaction mixture. The stirrer may also have a coating of a second material. The stirrers may be permanently attached to the gears or to the hollow shafts positioned within the passage through the hub of the gears, however, it is more preferred that the stirrers may be detached and removed from the gears or hollow shafts. For example, magnetic or loose couplings would allow the stirrers to be released and remain in the reaction vessels. Detachment would allow the stirrers to remain in the reaction vessels and perhaps conserve reaction product material. Wash techniques may be performed prior to the stirrer being removed from the vessel. It is envisioned that the stirrer may also function as an agitator to break up solid products or by-products. It is further envisioned that the stirrer may be integrated into the reaction vessel, to which the gear assembly couples when it is placed in alignment.

Figure 6:
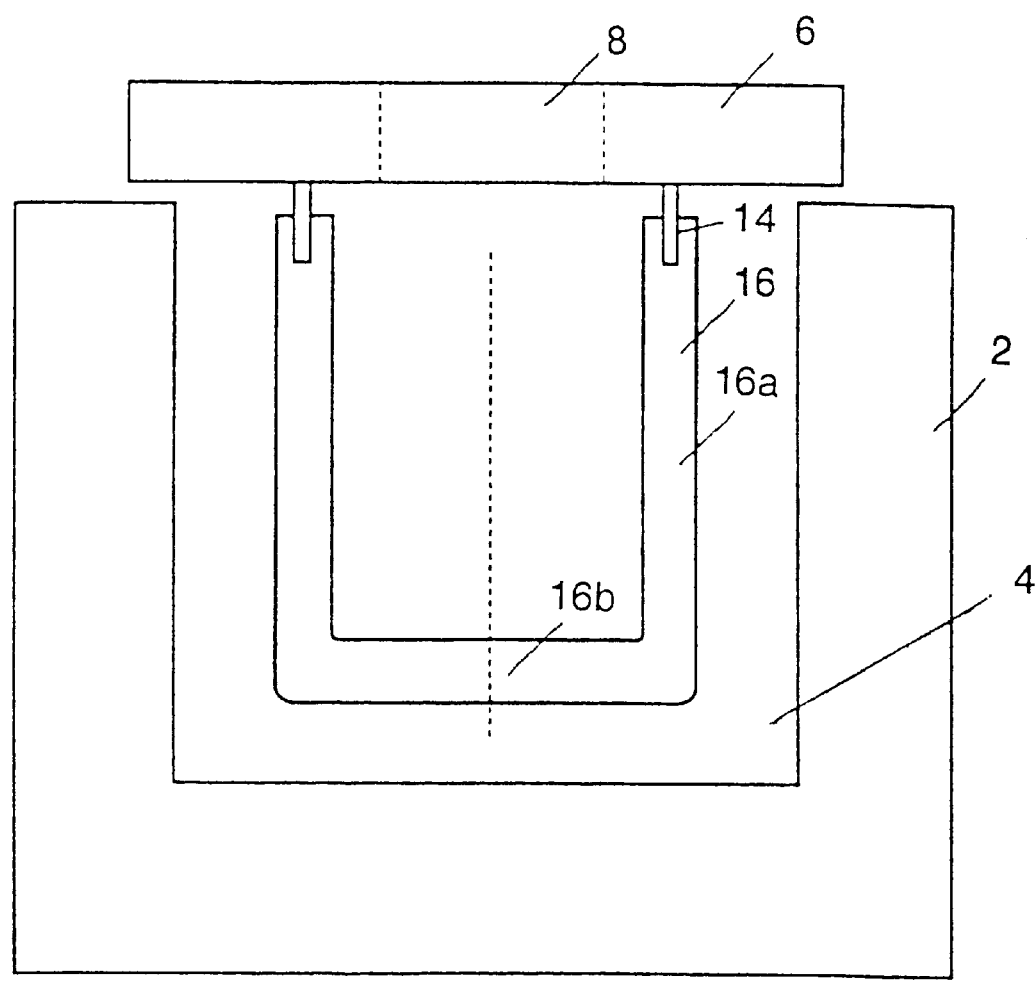
FIG. 6 is a sectional side view of one embodiment of the stirrer.

One suitable design for the stirrer is shown in FIG. 6, which is a sectional view. Turning to FIG. 6, central block 2 having well 4 defines the reaction vessel. Stirrer 16 is positioned within the reaction vessel and is attached via pegs 14 to gear 6. As gear 6 rotates, stirrer 16 also rotates, mixing the reaction mixture contained in well 4. The cross sectional shape of stirrer 16 is in the general shape of the uppercase letter "U". Stirrer 16 has a total of four vanes 16a, with each pair of vanes supported by a crossbar 16b. The crossbars 16b intersect at a center portion of the reaction vessel. The shape of the stirrer allows for the introduction of reagents through passage 8 of gear 6 and into the reaction mixture while the mixture is actively being stirred. In an alternative embodiment, the cross sectional shape of stirrer 16 is in the general shape of the uppercase letter "H", accomplished by attaching the crossbars 16b to vanes 16a at a midsection of vanes 16a. This description is directed at a preferred design, but other stirrer designs would be suitable.

Also, multiple stirrers may be used within a single reaction vessel, each being attached to the gear associated with the vessel.

The array of reaction vessels may be any of those known in the art, especially those used for combinatorial synthesis of materials. A preferred array of reaction vessels is described in WO 98/36826. The array contains at least two individual reaction vessels, and may contain tens or hundreds of individual reaction vessels. It may be preferred that the reaction vessels have a rounded bottom to avoid precipitate collecting in corners. For ease of understanding, the reaction vessels are shown herein as cylindrical bores in a central block. However, this example is merely for simplicity and is not intended to limit the scope of suitable reaction vessels. To maintain the alignment of the arrays of reaction vessels and the corresponding array of gears, guide pins, recesses, frames or other such alignment devices may be used.

As discussed above, it is preferred to add reagents to a central portion of the cross section of the reaction vessel to aid in achieving homogeneity of the mixture, especially when dealing with more viscous reaction mixtures such as those found in sol gel syntheses. It is most preferred to add reagents slightly off-center of the cross section of the reaction vessel. Therefore, the passage through the hub of the gear or through the hollow shaft is in alignment with an opening of the reaction vessel. A reagent delivery system is arranged so that reagent may be added to the reaction vessel through the passage in the hub of the gear, or through the hollow center portion of the hollow shaft. The reagent delivery system may be any of currently known delivery systems, and the design of the reagent delivery system is not critical to the success of the invention. Successful delivery systems will be those capable of adapting the introduction of the reagents to the passage through the hub of the gear or through the hollow shaft.

It is envisioned that the present invention has applications beyond combinatorial techniques and may be employed in more traditional single reaction experimental designs. This embodiment is as described above except that there is only one reaction vessel, associated with a single motor-driven gear. The key advantages of the present invention such as the capability of adding reagent while actively stirring and adding the reagent to a central portion of the cross section of the reaction vessel are also beneficial in a single reaction vessel setting.

What is claimed is:

1. An apparatus for parallel stirring comprising:
   a) N vessels where N is at least 2;
   b) N rotary drive members associated with the N vessels, each rotary drive member having a hub with material removed from the hub to form a passage through the rotary drive member;
   c) N fluid delivery conduits, each in fluid communication with a respective passage through a rotary drive member;
   d) a motor drivably associated with at least one rotary drive member;
   e) N stirrers, each stirrer rotateably driven by one of said rotary drive members, said N stirrers extending into the vessels; and
   f) a movable framework supporting the N rotary drive members forming a single unit that may simultaneously engage the N stirrers driven by the rotary drive members with the N vessels.

2. The apparatus of claim 1 wherein the fluid delivery conduits terminate before extending into the vessels.

3. The apparatus of claim 1 wherein the rotary drive members are gears having multiple teeth.

4. The apparatus of claim 1 wherein the motor is a variable speed motor.

5. The apparatus of claim 1 further comprising a microprocessor controlling the motor.

6. The apparatus of claim 1 further comprising a locking device engaging the vessels and the framework.

7. The apparatus of claim 6 further comprising at least one guide pin associated with the framework and the vessels.

8. The apparatus of claim 1 wherein all the rotary drive members engage one another.

9. The apparatus of claim 1 wherein defined groups of rotary drive members engage one another.

10. The apparatus of claim 1 wherein the stirrer is constructed of a material selected from the group consisting of Teflon™, glass, quartz, stainless steel, ceramic, polypropylene, and polyethylene.

11. The apparatus of claim 1 wherein the stirrer is coated with an inert material.

12. The apparatus of claim 1 wherein the stirrer has four vanes and two intersecting crossbars.

13. The apparatus of claim 1 further comprising N hollow shafts, one hollow shaft positioned within each passage through the rotary drive members and said hollow shafts terminating above the vessels.

14. The apparatus of claim 13 wherein the stirrers are attached to the hollow shafts.

15. An apparatus for stirring comprising:
   a) a gear having a hub and multiple teeth with material removed from the hub to form a passage through the gear;
   b) a motor drivably associated with the gear;
   c) a vessel associated with the gear; and
   d) a stirrer rotateably driven by the gear and extending into the vessel wherein the stirrer has four vanes and two intersecting crossbars.

16. The apparatus of claim 15 further comprising a conduit in fluid communication with the passage through the gear, said conduit terminating above said reaction vessel.

17. The apparatus of claim 15 further comprising a microprocessor controlling the motor.

18. The apparatus of claim 15 further comprising a hollow shaft positioned within the passage through the gear, said hollow shaft terminating above said reaction vessel.

19. The apparatus of claim 18 wherein the stirrer is attached to the hollow shaft.

20. A method of adding reagents to a plurality of N reaction vessels each containing a reaction mixture comprising:
   a) providing:
      i) N vessels where N is at least 2;
      ii) N rotary drive members associated with the N vessels, each rotary drive member having a hub with material removed from the hub to form a passage through the rotary drive member;
      iii) N fluid delivery conduits, each in fluid communication with a respective passage through a rotary drive member;
      iv) a motor drivably associated with at least one rotary drive member;
      v) N stirrers, each stirrer rotateably driven by one of said rotary drive members, said N stirrers extending into the vessels; and
      vi) a movable framework supporting the N rotary drive members forming a single unit that may simultaneously engage the N stirrers driven by the rotary drive members with the N vessels;
   b) engaging the movable framework with the N vessels;
   c) adding reagent to the N reaction vessels via the N conduits; and
   d) stirring, simultaneously the N reaction mixtures during the addition of reagent by activating the motor and driving the gears.

* * * * *